Dec. 23, 1947.  A. J. V. WARE  2,433,178
SEED CLEANER
Filed Aug. 29, 1945  2 Sheets-Sheet 1
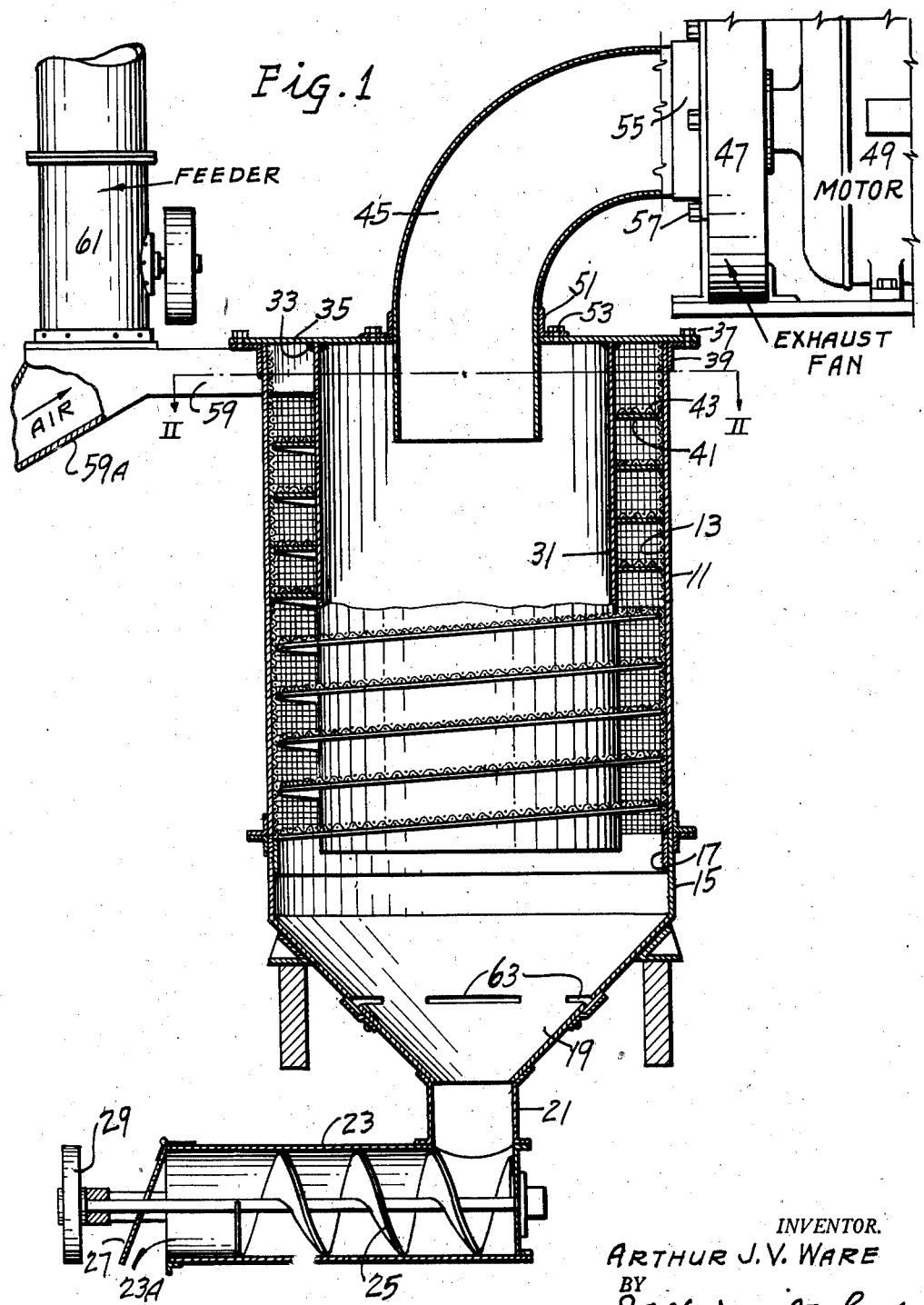
INVENTOR.
ARTHUR J. V. WARE Dec. 23, 1947.     A. J. V. WARE     2,433,178
SEED CLEANER
Filed Aug. 29, 1945     2 Sheets-Sheet 2
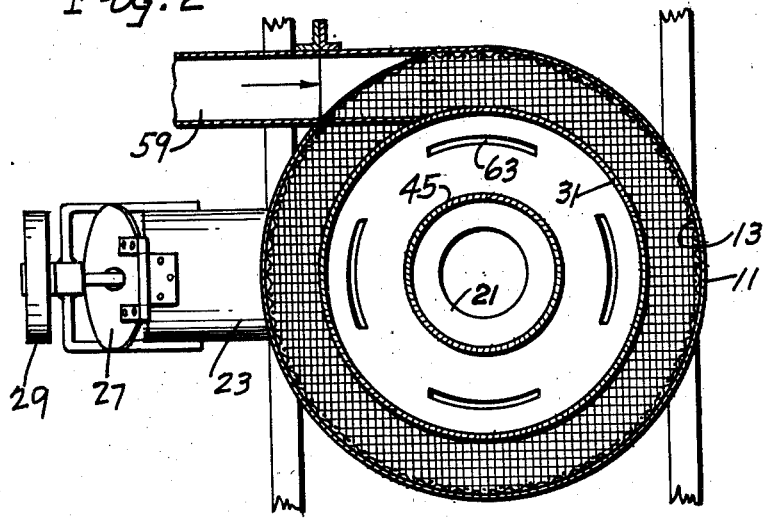
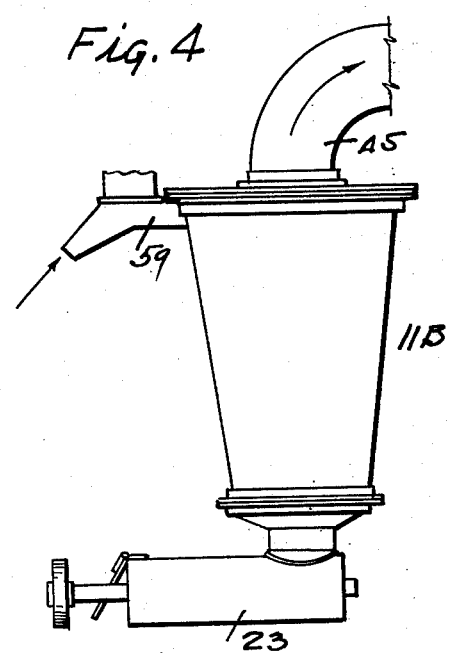
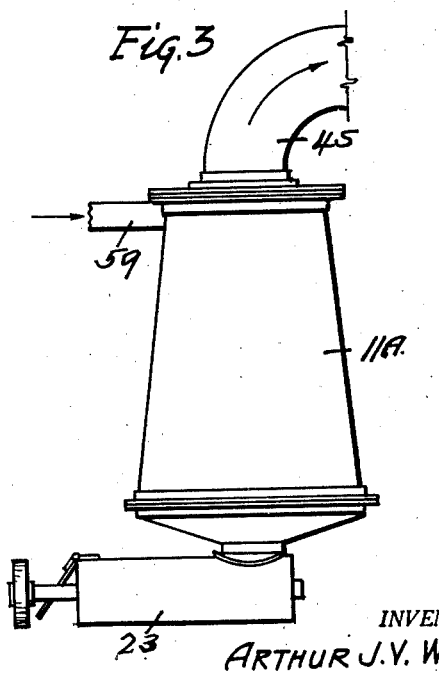
INVENTOR.
ARTHUR J. V. WARE
BY Patented Dec. 23, 1947

2,433,178

UNITED STATES PATENT OFFICE 2,433,178

SEED CLEANER

Arthur J. V. Ware, Memphis, Tenn.

Application August 29, 1945, Serial No. 613,244

16 Claims. (Cl. 19—41)

This invention relates to improvements in means for removing lint from cotton seed, or husks and dirt from grains, and more particularly relates to means for removing lint from cotton seed, either before the seed have been crushed or thereafter from the hulls after the seed have been crushed, to which the accompanying description will in general be confined.

It is well known that after the usual ginning process there are particles of lint which adhere very closely to the cotton seed and which are not only objectionable on the seed, but which in and of themselves are valuable and find a ready market.

All machines, so far as are now known, employ stationary parts and parts which are relatively rotated to discharge the seed against and move them over abrasive surfaces which dislodge the lint from the seed.

The primary object of the present invention is:

To eliminate the movable parts heretofore deemed necessary and accomplish the dislodgement of the lint and its separation from the seed.

Further objects are:

To provide means for effecting improved delinting and cleaning action on cotton or other seeds;

To simplify and improve the design and construction of delinting mechanisms; and To provide delinting mechanism readily accessible for removal of parts subject to excessive wear.

These objects are accomplished by establishing a substantially spiral passageway lined in whole or in part with abrasive and traversing the seed through this passageway at high velocity by a current of air which inherently, because of the construction, throws the seed centrifugally outward against and along the abrasive lining of the passageway and discharges both seed and lint into a hopper in which the lint is segregated from the seed, the lint is removed by the air current, and the seed is discharged by gravity, the impelling and progressing air current tending to effect a segregation of the light detached lint from the heavier seed and effecting a segregation thereof which makes it easy to accomplish the separate final removals of the materials.

The means by which these and other objects are accomplished, and the manner of their accomplishment, will readily be understood from the following specification upon reference to the accompanying drawings, in which:

Fig. 1 is a sectional elevation of the preferred form of the machine with auxiliary feeder and fan mechanisms of conventional type indicated in elevation.

Fig. 2 is a sectional plan taken on the line II—II of Fig. 1.

Fig. 3 is an elevation on a reduced scale showing a modification of the machine in which the casing is of truncated conical-shape, rather than the truly cylindrical shape, indicated in Fig. 1; and Fig. 4 is a similar view in which the casing is of inverted truncated, conical form.

Referring now to the drawings in which the various parts are indicated by numerals:

11 is an outer imperforate casing of cylindrical form which is lined throughout its length with an abrasive surface, here shown as a screen 13, which may be of wire mesh, of either round or non-circular wire, or of expanded metal. Preferably a sheet of wire mesh having a width equal to the height of the casing and a length equal to its inner circumference is rolled, or otherwise formed, into a cylinder and lowered into place until it rests on a band 17, to form the lining. The casing 11 extends below the lower portion of the screen, being here shown as an extension 15, and may be conveniently provided with the annular interior band 17 on which the lining 13 is supported.

At its lower end the extension 15 is converged to form a conical hopper 19 which discharges through a central opening and a passageway 21 into the casing 23 of a conveyor which may be of well known screw-flight type 25, the conveyor flight terminating short of the discharge end of the conveyor in well known manner, to build up a mass of seed substantially blocking entrance and reverse flow of air. The discharge end of the conveyor is preferably provided with a swinging head 27 which aids in such blocking and is forced open by the discharging material. The conveyor flight is preferably driven as through a belt pulley 29 from an exterior source of power, not shown.

Concentrically disposed within the casing 11 is an inner casing 31, of substantially the length of the screen portion of the outer casing, which is open at its lower end, and at its upper end is integrally secured as by welds 33 to a head 35, this head being removably secured as by cap screws or bolts 37 to an encircling flange 39 integrally secured to the upper end of the outer casing 11.

Disposed around the exterior of the inner casing 31 is a spiral flight 41 which is continuous from adjacency to the top end of the inner casing to the bottom end thereof. Preferably at least the upper surface of this flight is provided with an abrasive surface 43 which may be of mesh type, similar to the lining 13 of the outer casing. The outer diameter of the spiral flight is such that it loosely contacts the inner surface of the abrasive lined outer casing 11, but is preferably small enough to allow the inner casing and flight to be removed from or replaced in the outer casing from time to time as conditions may render advisable.

The head 35 has a central opening and is connected by a pipe 45 to an exhaust fan 47, preferably driven by a motor 49. The pipe 45 may be connected to the head by an annular flange 51, the flange being secured to the head as by cap screws 53, which may be removed and the flange and pipe detached. Preferably the pipe 45 extends through the head 35 and a short distance downward within the inner casing. The upper end of the pipe is preferably connected through a flange 55 and removable screws 57 to the fan, so that the pipe may be removed, the head 35 be released, and, together with the inner casing 31 and the flight 41, be removed to permit replacement of the abrasive linings. Removal of the lining from outer casing is then easily accomplished by collapsing the screen sheet 13 which forms the lining and lifting it out through the then open top of the casing and replacement effected by lowering a screen sheet rolled to cylindrical form until it rests on the supporting annular ring 17.

The flight 41 around the removed inner casing may also be relined and the inner casing replaced, and so replaced, holding the lining of the outer casing to place. The head is secured and coupled up to the fan and the mechanism is again ready for use.

59 is an entrance passageway for air, open at its outer end, this passageway leading tangentially into the upper end of the outer casing. Disposed above and feeding into this passageway is a feeder 61 of conventional type through which a regulated supply of seed to be delinted or cleaned is delivered into the current of air drawn through the passageway. Preferably the bottom 59A of the passageway is downwardly converged toward its open end so that heavy material, such as pieces of iron, small stones and pebbles inadvertently fed in with the seed, may discharge through such open end. 63 are minor openings through the walls of the hopper 19 which admit small quantities of air and break up tendency of lint to pack in the hopper.

It will be noted that the pipe 45, as indicating the capacity of the fan, is much larger in area than is the passageway 59 or the spiral passageway established by the flight 41. Air is exhausted by the fan 47 at high velocity through the pipe 45. This air enters through the passageway 59, and descends spirally following the flight established passageway to the lower end of the inner casing 31; thence passes upward through this casing and the pipe 45 to the exhaust fan, the passageway 59 and the spiral passageway established by the flight, being relatively of so much less area than that through the inner casing and the pipe 45 to the fan, that a relatively high velocity is established through the feeder passageway 59 and the spiral passageway.

In Fig. 3, an outer casing 11A is shown which increases in size from top to bottom rather than being cylindrical as shown in Fig. 1, and in Fig. 4, the outer casing 11B decreases in size from top to bottom. Either of these forms may be used instead of the cylindrical form should it be so desired.

It will be understood also that while the preferred positioning of the casings is vertical they may be horizontally disposed or otherwise should it be so desired, the horizontal position being indicated where the length of the casings relatively to their diameters is greatly increased.

In preferred construction, the hopper 19 with cylindrical upward extension 15 and the ring 17 secured therein to form a support for the lining 13 is provided. The cylindrical outer casing is secured to the extension 15. A sheet of wire screen, of width equal to the height of the casing, and of length conforming to the inner circumference is rolled or otherwise shaped into cylindrical form and slipped downward into the casing until it is supported by the ring 17. If screen of proper width is not available two sections or more may be used, and if not of sufficient length, preferably two semi-cylindrical sections are rolled and these sections placed within the casing. Should there be obstructions in the upper end of the casing the cylindrical screen section may be temporarily reduced in diameter for insertion and allowed to spring back into place after the lining has been inserted.

The flight 41 is secured to the exterior of the inner casing 31, as by welding. The casing is secured concentrically about the opening in the head 35 and is secured to the head as by welding, and the spiral flight 41, and arcuate sectors of the screen 43 are supported on the spiral flight to form a continuous spiral abrasive surface therefor, these sectors, if it be deemed necessary, being tacked to the flight from time to time, as by spot welding, to prevent their displacement. The inner casing assembly thus formed is lowered into the outer casing until the head rests on and is supported by the outer casing and the head secured, as by the screws 37, to the flange 30 of the outer casing.

The motor and fan 47 are set up and the fan connected through the pipe 45 to the head of the inner casing. The feeder 61 is set up and the feeder passageway 59 coupled to the tangential opening into the outer casing and the conveyor 23 coupled to the bottom of the hopper.

In use, the fan is started and a violent exhaust current of air is set up through the feeder passageway 59, the spiral passageway established by the flight 41 and the casing, the open bottom inner casing and the pipe 45 to the fan, the head 27 of the discharge conveyor sufficiently closing off air flow through the conveyor to permit establishment of this current flow.

Seed are fed in through the feeder 61 at a rate regulated by the feeder, the seed dropping into the feeder passageway 59 and being picked up by the current of air entering therethrough, with heavy material, such as bolts and nuts, small stones and the like, overcoming this current flow and dropping on the inclined bottom 49A of the passageway and being discharged. The seed are carried by the current into the spiral passageway and are thrown violently against the screen 13 as they are progressed through the passageway, and also are thrown to a lesser extent against the flight screen 43.

The rate of feed of the seed is so regulated that the spiral passageway is only partially filled and the seed in their passage through the spiral passageway are constantly turning and shifting so that all portions thereof are brought in contact with the abrasive surface, and lint, chaff or other materials is loosened therefrom, but is carried by the air current to discharge into the hopper, the heavier material descending by gravity along the hopper wall and into the conveyor by which it is removed and discharged.

The lint, chaff or other light material ascends with the current of air through the center of the inner casing and the pipe 45 to the fan and is discharged by the flow. At the same time some air, in relatively very minor quantity, enters through the ports 63 in the hopper, and even through the conveyor itself, and breaks up an inherent tendency which the lint or chaff has to form in a mass in the hopper and interfere with the desired action.

In these actions the seed and dirt or chaff traversed along the spiral passageway seal the relatively small opening between the flight and the outer casing lining to such extent that longitudinal air flow along the outer casing is negligible, and the heavier material substantially seals off flow of air through the conveyor.

It will be understood that the relative diameters of the inner and outer casings to their length and the spacing of the convolutions of the flight 41 must be varied in accordance with the nature of the seeds which are being delinted or cleaned and the amount of lint or chaff to be removed therefrom.

It will be further understood that the inner casing may be imperforate or perforate as conditions may demand.

I claim:

1. In a seed cleaner, concentric outer and inner cylindrical casings, said outer casing having an abrasive lining, a head centrally apertured forming one end of both said casings, a hopper, and a discharge conveyor carried thereby forming a closure and seal for the opposite end of said outer casing, the corresponding end of said inner casing being open into said hopper, an air entrance passageway leading tangentially into the space between said casings adjacent said head, a spiral flight around and carried by said inner casing extending into adjacency with the lining of said outer casing and cooperating with said casings to establish a spiral passageway from said air entrance passageway to said hopper, means for feeding seed to be cleaned into said air entrance passageway, and means for establishing an exhaust current of air from said inner casing through said head aperture, the diameter of said inner casing as related to said outer casing and to the pitch of said flight establishing a said spiral passageway of greatly restricted area as compared to the area of said inner casing, whereby to accelerate said current and establish a seed propelling air flow through said spiral passageway and a relatively reduced lint removing and seed releasing flow upward through said inner casing.

2. In a seed cleaner, concentric outer and inner vertically disposed casings of circular cross section, said outer casing having an abrasive lining, a centrally apertured head forming the upper end of both said casings, a hopper forming the lower end of said outer casing, a discharge conveyor below and secured to and receiving discharge from said hopper, and cooperating with said discharge to effect a hopper seal, the lower end of said inner casing being open into said hopper, an air entrance passageway leading tangentially into the space between said casings adjacent said head, a spiral flight around and carried by said inner casing extending into adjacency with the lining of said outer casing, cooperating with said casings to establish a spiral passageway therebetween from said air entrance passageway to said hopper, means for feeding seed to be cleaned into said air entrance passageway, and exhaust means for establishing rapid air flow upward through said inner casing, the diameter of said inner casing as related to said outer casing and to the pitch of said flight establishing a said spiral passageway of greatly restricted area as compared to the area of said inner casing, whereby to accelerate said air flow and establish a seed propelling flow through said spiral passageway and a relatively reduced lint removing and seed releasing flow upward through said inner casing.

3. A seed cleaner, including concentric outer and inner imperforate cylindrical casings vertically disposed, said outer casing having an abrasive lining, a centrally apertured head forming the upper end of both said casings, a hopper forming the lower end of said outer casing, and a discharge conveyor secured to said hopper, said hopper discharging into said conveyor, the lower end of said inner casing being open into said hopper, an air entrance passageway leading tangentially into the space between said casings adjacent said head, a spiral flight around and carried by said inner casing extending into adjacency with said outer casing and cooperating with said casings to establish a spiral passageway therebetween from said air entrance passageway to said hopper, means for feeding seed to be cleaned into said air entrance passageway, and means for exhausting air at high velocity from said inner casing through said head aperture, the diameter of said inner casing as related to said outer casing and to the pitch of said flight establishing a said spiral passageway of greatly restricted area as compared to the area of said inner casing, whereby to accelerate air flow therethrough and establish a seed propelling air flow through said spiral passageway and a relatively reduced lint removing and seed releasing flow upward through said inner casing.

4. A seed cleaner in accordance with claim 3, in which said hopper has air openings of minor extent leading thereinto.

5. In a seed cleaner, a vertically disposed casing of circular cross section, a head closing the upper end of said casing, a hopper forming the lower head of said casing, and conveyor means, coupled to and receiving discharge from said hopper, forming a closure for the lower end of said hopper, means establishing an air entrance passageway tangentially into said casing adjacent said head, means within said casing and cooperating therewith establishing a continuous spiral passageway of many times less area than said casing, along the inner surface of said casing from said air entrance passageway to said hopper, means establishing an abrasive lining along the peripheral portion of said spiral passageway, means for feeding seed to be cleaned into said air entrance passageway, and means for exhausting air entering through said entrance passageway at high velocity downward through said spiral passageway into said casing, and upward apart from said spiral passageway at greatly reduced velocity through said casing and its upper head, for traversing seed through said spiral passageway and removal of lighter material from said casing.

6. In a seed cleaner, a vertically disposed cylindrical casing, a head closing the upper end of said casing, a hopper forming the lower head of said casing, and conveyor means, coupled to and receiving discharge from said hopper, forming a closure for the lower end of said hopper, means establishing an air entrance passageway tangentially into said casing adjacent said head, means within said casing and cooperating therewith establishing a continuous spiral passageway of many times less area than said casing, from said air entrance passageway to said hopper, means establishing an abrasive lining along the peripheral portion of said spiral passageway, means for feeding seed to be cleaned into said air entrance passageway, and means for exhausting air at high velocity through said entrance passageway and downward through said spiral passageway into said casing, and upward apart from said spiral passageway at greatly reduced velocity through said casing and its upper head, for traversing seed through said spiral passageway and removal of lint from said casing.

7. In a seed cleaner, a vertically disposed casing of circular cross section, a head closing the upper end of said casing, a hopper forming the lower head of said casing, and conveyor means, coupled to and receiving discharge from said hopper, forming a closure for the lower end of said hopper, means establishing an air entrance passageway tangentially into said casing adjacent said head, means within said casing and cooperating therewith establishing a continuous spiral passageway of many times less area than said casing, from said air entrance passageway to said hopper, means for feeding seed to be cleaned into said air entrance passageway, and means for exhausting air at high velocity downward through said spiral passageway into said casing, and upward apart from said spiral passageway at greatly reduced velocity through said casing and its upper head, for traversing seed through said spiral passageway and removal of lighter material from said casing.

8. In a seed cleaner, a vertically disposed cylindrical outer casing, a hopper forming a lower head for said casing, conveyor means, coupled to and receiving discharge from said hopper, forming a closure for the lower end of said hopper, means establishing an air entrance passageway tangentially into said casing adjacent its upper end, an abrasive lining as of wire mesh removably disposed in said casing, and means for feeding seed to be cleaned into said air entrance passageway; a centrally apertured head at the upper end of said casing, an inner cylindrical casing concentric with said outer casing integrally secured to said head around said aperture and depending into said hopper, said inner casing being open at its lower end, a spiral flight integrally secured around the outside of said inner casing, extending from said passageway substantially throughout the length of said casing, said flight radially being of width to closely but removably lie along the abrasive lining of said outer casing and cooperate with said casing to establish a spiral passageway, an exhaust fan, and a pipe secured to said head and said fan, and connecting said head opening and said fan, said upper head being detachably secured to said outer casing and to said pipe to permit removal of said inner casing for renewal of said abrasive lining.

9. A seed cleaner, including a vertically disposed cylindrical outer casing, an abrasive lining as of wire mesh removably disposed in said casing, a centrally apertured head secured to the upper end of said casing, an inner cylindrical casing concentric with said outer casing integrally secured to said head around said aperture and depending therefrom, a spiral flight integrally secured around the outside of said inner casing, substantially throughout the length of said casing, said flight radially being of width to closely but removably lie along the abrasive lining of said outer casing and cooperate with said casing to establish a spiral passageway, and an exhaust pipe leading from the central aperture of said head, said upper head being detachably secured to said outer casing to permit removal of said inner casing for renewal of said abrasive lining.

10. A seed cleaner, including a vertically disposed outer casing of circular cross section, an abrasive lining as of wire mesh removably disposed in said casing, a centrally apertured head secured to the upper end of said casing, an inner casing concentric with said outer casing integrally secured to said head around said aperture and depending therefrom, a spiral flight integrally secured around the outside of said inner casing, substantially throughout the length of said casing, said flight radially being of width to closely but removably lie along the abrasive lining of said outer casing and cooperate with said casing to establish a spiral passageway, and an exhaust pipe leading from the central aperture of said head, said upper head being detachably secured to said outer casing to permit removal of said inner casing for renewal of said abrasive lining.

11. A seed cleaner, including concentric outer and inner casings of circular cross section, said outer casing having an abrasive lining, and a spiral flight interposed between said casings establishing a spiral passageway between said casings, the pitch of said spiral flight and the diameter of said inner casing as related to its spacing from said outer casing providing a passageway through said inner casing many times in excess of the area of said spiral passageway, a head forming one end of both said casings, an open seed hopper forming the opposite end of said outer casing, the corresponding ends of said inner casing and said spiral passageway being open into said hopper, an air entrance passageway leading tangentially into the space between said casings adjacent said head and being continued by said spiral passageway, a conveyor carried by the open end of said hopper, adapted to receive discharge therefrom and close said open end, means for feeding seed into said air entrance passageway, and means extending through said head into said inner casing for exhausting air therefrom, and at greatly increased velocity through said spiral passageway.

12. A seed cleaner in accordance with claim 11, in which at least one surface of said flight has an abrasive lining.

13. A seed cleaner in accordance with claim 11, in which said casings are vertically disposed and said head forms the upper end of both thereof.

14. A seed cleaner in accordance with claim 13, in which said casings are cylindrical.

15. A seed cleaner in accordance with claim 11 in which said casings are cylindrical.

16. In a seed cleaner, a vertically disposed casing of circular cross section, a head closing the upper end of said casing, a hopper forming the lower head of said casing, and conveyor means, coupled to and receiving discharge from said hopper, forming a closure for the lower end of said hopper, means establishing an air entrance passageway tangentially into said casing adjacent said head, means within said casing establishing a continuous spiral passageway of many times less area than said casing, from said air entrance passageway to said hopper, means establishing an abrasive lining along the peripheral portion of said spiral passageway, means for feeding seed to be cleaned into said air entrance passageway, and means for exhausting air entering through said entrance passageway at high velocity through said spiral passageway into said casing, and upward apart from said spiral passageway at much reduced velocity through said casing and its upper head, for traversing seed through said spiral passageway and removal of lighter material from said casing.

ARTHUR J. V. WARE.

REFERENCES CITED

The following references are of record in the file of this patent:

UNITED STATES PATENTS

| Number | Name | Date |
|---|---|---|
| 618,785 | Crowe | Jan. 31, 1899 |
| 980,349 | De Sagundo | Jan. 3, 1911 |
| 1,505,743 | Stebbins | Aug. 19, 1924 |
| 2,402,203 | Pharo | June 18, 1946 |

FOREIGN PATENTS

| Number | Country | Date |
|---|---|---|
| 282,258 | Great Britain | Dec. 22, 1927 |